(12) United States Patent
Feder et al.

(10) Patent No.: US 9,592,644 B2
(45) Date of Patent: Mar. 14, 2017

(54) METHOD OF AND APPARARTUS FOR INSCRIPTION OF FIBER GRATINGS FROM MULTIPLE AZIMUTHAL ANGLES AND FIBER SO INSCRIBED

(71) Applicant: OFS Fitel, LLC, Norcross, GA (US)

(72) Inventors: Kenneth S Feder, Murray Hill, NJ (US); Tristan Kremp, Somerset, NJ (US); Paul S Westbrook, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 166 days.

(21) Appl. No.: 14/211,996

(22) Filed: Mar. 14, 2014

(65) Prior Publication Data
US 2014/0270643 A1    Sep. 18, 2014

Related U.S. Application Data

(60) Provisional application No. 61/786,847, filed on Mar. 15, 2013.

(51) Int. Cl.
  *G02B 6/34*  (2006.01)
  *B29D 11/00*  (2006.01)
  *G02B 6/02*  (2006.01)

(52) U.S. Cl.
  CPC .... *B29D 11/00721* (2013.01); *G02B 6/02138* (2013.01); *G02B 6/02133* (2013.01)

(58) Field of Classification Search
  None
  See application file for complete search history.

(56) References Cited

U.S. PATENT DOCUMENTS

| 5,363,239 | A  | * | 11/1994 | Mizrahi | ............... C03C 13/045 359/569 |
| 2002/0015919 | A1 | * | 2/2002 | Kristensen | ......... G02B 6/02109 430/321 |
| 2002/0041733 | A1 | * | 4/2002 | Mihailov | ........... G02B 6/02138 385/37 |
| 2014/0329172 | A1 | * | 11/2014 | Hart | ........................ G03H 1/04 430/2 |

FOREIGN PATENT DOCUMENTS

WO    97/44692    11/1997

OTHER PUBLICATIONS

Japanese Patent Application No. 2014-53098—Notice of Reason for Refusal dated Jun. 2, 2015.
Japanese Patent Application No. 2014-053098—Notification of Reasons for Refusal dated Dec. 7, 2015.

* cited by examiner

*Primary Examiner* — Eric Wong

(57) ABSTRACT

A method of, and apparatus for, inscribing a grating in an optical waveguide so as to reduce transverse inscription variations, are provided. The waveguide is exposed to multiple beams or interference patterns of actinic radiation from multiple azimuthal directions. The beams of actinic radiation are preferably split into a plurality of beams that have wave vectors with different longitudinal components, e.g., via gratings such as phase masks. The periods and phases of the interference patterns of the beams of actinic radiation are preferably matched. A control beam may be provided that does not hit the waveguide. A control loop optionally controls at least one of the position or orientation of at least one of the beams of actinic radiation. The gratings are, for example, Bragg gratings.

20 Claims, 6 Drawing Sheets

METHOD OF AND APPARARTUS FOR INSCRIPTION OF FIBER GRATINGS FROM MULTIPLE AZIMUTHAL ANGLES AND FIBER SO INSCRIBED

RELATED APPLICATIONS

Domestic priority is claimed from U.S. Provisional Patent Application No. 61/786,847 filed Mar. 15, 2013, entitled "Inscription of fiber Bragg gratings from multiple azimuthal angles", the teachings of which are incorporated by reference herein.

BACKGROUND OF THE INVENTION

Field of the Invention

The invention is directed to multicore optical waveguides or fibers. More specifically, the invention is directed to methods of inscribing gratings in multicore optical waveguides or fibers in a manner that reduces variations of the strength of gratings such as Bragg gratings within a core, between different cores, or the like.

Description of Related Art

Exposure of a multicore fiber for purposes of, e.g., inscribing gratings such as Bragg gratings, is conventionally done from one azimuthal direction. The fiber/longitudinal axis is perpendicular to the drawing plane, which is the transverse plane (see FIG. 8). Note that the rays incident on the fiber are usually a superposition of at least two beams with different wave vector components in the direction of the fiber axis, e.g., generated by the shown phase mask that is parallel to the fiber.

Especially in fibers that are not azimuthally invariant (e.g., multicore or microstructured fibers), the transverse distribution of the refractive index change that forms a Bragg grating depends on the azimuthal direction of the inscribing actinic (UV) radiation, see FIG. 1: The lensing effect caused by the curved interface between the fiber and the surrounding lower-index material (usually air) makes the grating in a certain core stronger if this core is on the remote side of the fiber (with respect to the incoming beam). This effect is also evident in the slow sinusoidal grating strength variation in FIG. 2, which results from twisting of the offset core into different positions into and out of the remote side of the fiber. Similarly important is the shadowing effect due to other cores or transverse inhomogeneities that can shadow or change the path of the incident actinic radiation, giving rise to the sharp spikes in FIG. 2. These huge variations (both maxima and minima) of the grating strength can substantially reduce the yield in the grating fabrication process.

For some types of fibers, for instance, multicore fibers with the cores arranged in a hexagonal array, it is possible to find at least one optimal azimuthal angle such that the variance of the grating strengths due to shadowing and lensing is minimized in the different cores of a multicore fiber. For twisted multicore fibers, this optimum angle depends on the location z along the fiber, making it impossible to globally minimize the grating strength variations if the actinic radiation source comes from only one azimuthal angle.

SUMMARY OF THE INVENTION

The invention is a method of inscribing a grating in an optical waveguide having at least one core and at least one cladding. The waveguide is exposed to a first beam or interference pattern of actinic radiation from a first azimuthal direction and at least a second beam or interference pattern of actinic radiation from at least a second azimuthal direction. The two exposure steps may be performed simultaneously or consecutively. Each beam or interference pattern may be generated by its own source, or a common source may be provided to generate both the first and second beams or interference patterns of actinic radiation from the first and second azimuthal directions.

The first and second beams of actinic radiation may be split into interference patterns or a plurality of beams with different longitudinal components of their wave vectors, e.g., via gratings such as phase masks.

The periods and phases of the interference patterns of actinic radiation are preferably matched. The orientation and spatial phase of one of the first and second interference patterns of actinic radiation is matched to that of the other of the first and second interference patterns of actinic radiation.

Preferably, a control beam is provided that does not hit the waveguide. Preferably, a control loop is provided that controls at least one of the position or orientation of at least one of the first and second beams or interference patterns of actinic radiation.

The inscription being performed on the waveguide preferably includes Bragg gratings.

The invention also includes an apparatus for inscribing a grating in an optical waveguide having at least one core and at least one cladding. The apparatus includes a first beam or interference pattern of actinic radiation at a first azimuthal direction with respect to the waveguide and at least a second beam or interference pattern of actinic radiation at least at a second azimuthal direction with respect to the waveguide.

In one embodiment, a first source generates the first beam or interference pattern of actinic radiation from the first azimuthal direction; and a second source generates the second beam or interference pattern of actinic radiation from the second azimuthal direction. Optionally, a common source generates both the first and second beams or interference patterns of actinic radiation from the first and second azimuthal directions.

Preferably, first and second gratings are adapted to split the first and second beams of actinic radiation each into a plurality of beams that have wave vectors with different longitudinal components.

Preferably, the periods and phases of the first and second interference patterns of actinic radiation are matched.

The inventive apparatus optionally includes a control beam that does not hit the waveguide, and a control loop that controls at least one of the position or orientation of at least one of the first and second beams of actinic radiation.

To reduce transverse variations, e.g., within a core or between different cores, of the strength of Bragg gratings when writing Bragg gratings into a waveguide (e.g., a twisted or untwisted optical fiber, with one or multiple cores), we expose the waveguide (e.g., optical fiber) from at least two different azimuthal directions, using interference patterns whose fringe patterns' orientation and spatial phase are matched, either passively or actively, to avoid or eliminate destructive interference between the fringe patterns along the fiber axis, as well as across the transverse dimension of the fiber (e.g., in multiple offset cores).

That is, an embodiment of the present invention depicts a method for reducing transverse variations in strength of Bragg gratings by providing a waveguide having at least one core, and at least one cladding, and writing Bragg gratings into one or more of the cores or claddings of the waveguide by exposing the waveguide from at least two different azimuthal directions using multiple interference patterns, wherein the fringe pattern orientation and spatial phase of each interference pattern is matched respectively to the other interference patterns.

DETAILED DESCRIPTION OF THE INVENTION AND DRAWINGS

Description will now be given with reference to the attached FIGS. 1-8. It should be understood that these figures are exemplary in nature and in no way serve to limit the scope of the invention, which is defined by the claims appearing hereinbelow.

Figure 1:
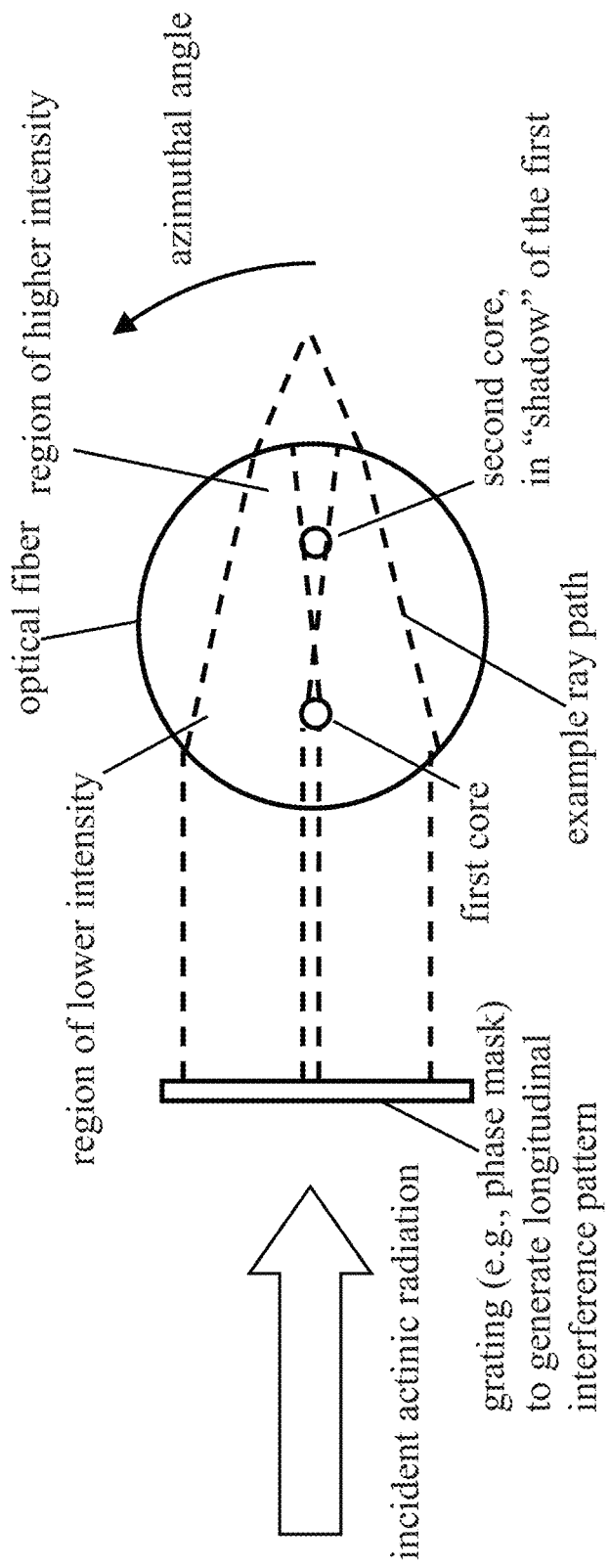
FIG. 1 is a side schematic depicting exposure of a multicore fiber to inscribing radiation from one azimuthal direction as is known conventionally.
Figure 2:
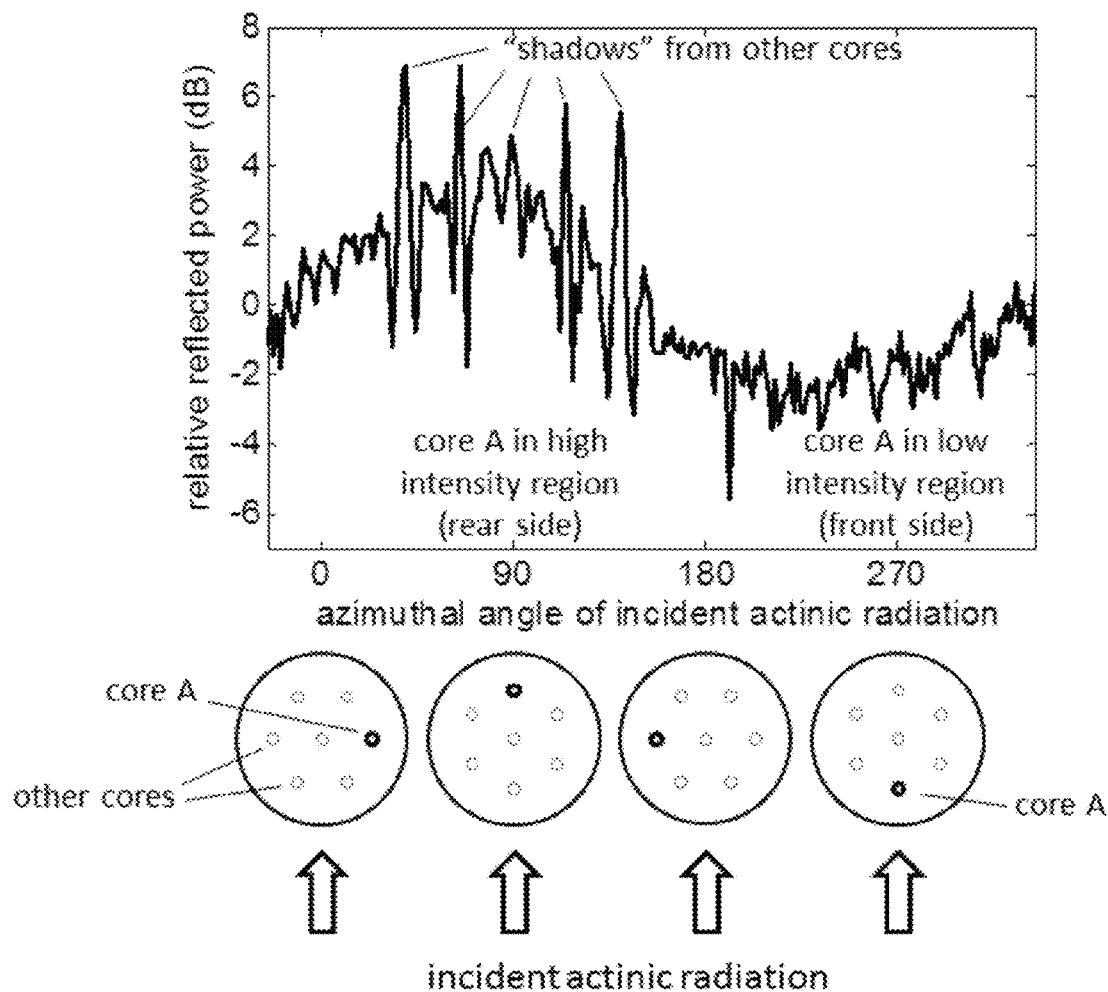
FIG. 2 is a graph and schematic depicting the dependence of the reflected power from a Bragg grating in an outer core ("core A") of a twisted 7-core fiber on the azimuthal angle of the incident actinic radiation as is known conventionally.
Figure 3:
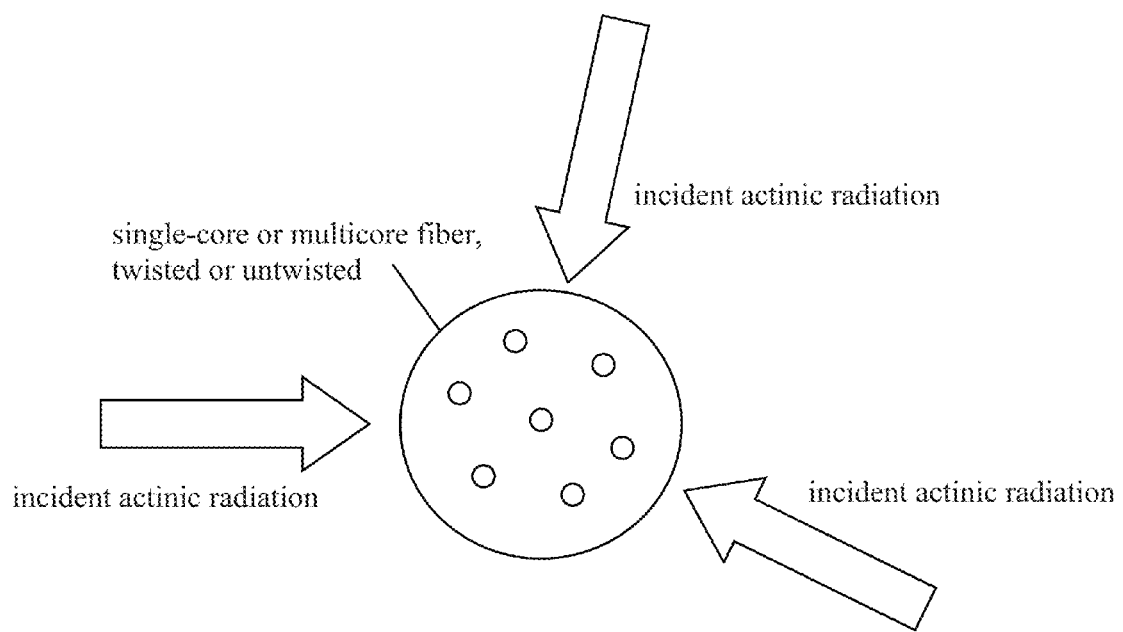
FIG. 3 is a front view schematic showing the exposure of a fiber from various (at least two) azimuthal directions in accordance with the invention.
Figure 4:
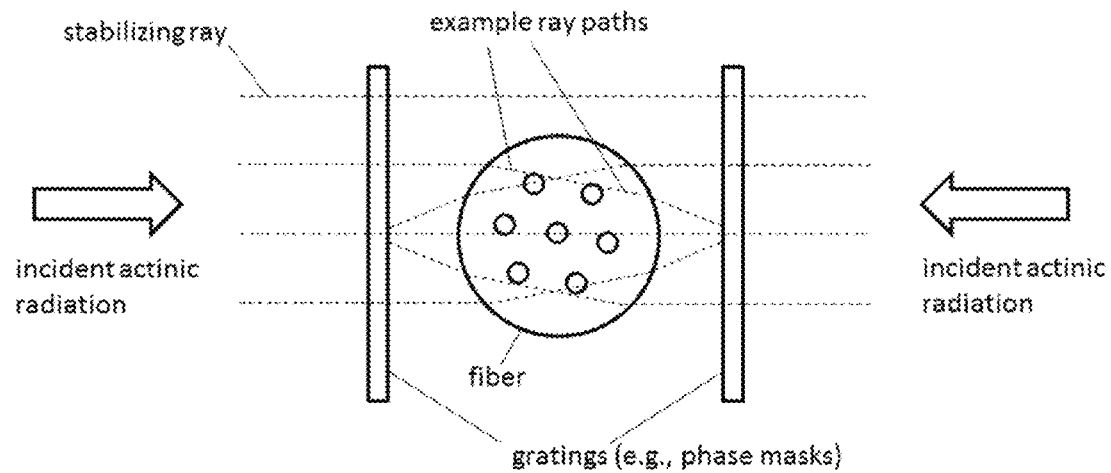
FIG. 4 is a front view schematic of phase mask based exposure from two opposite directions (azimuthal angle difference 180°) in accordance with the invention.
Figure 5:
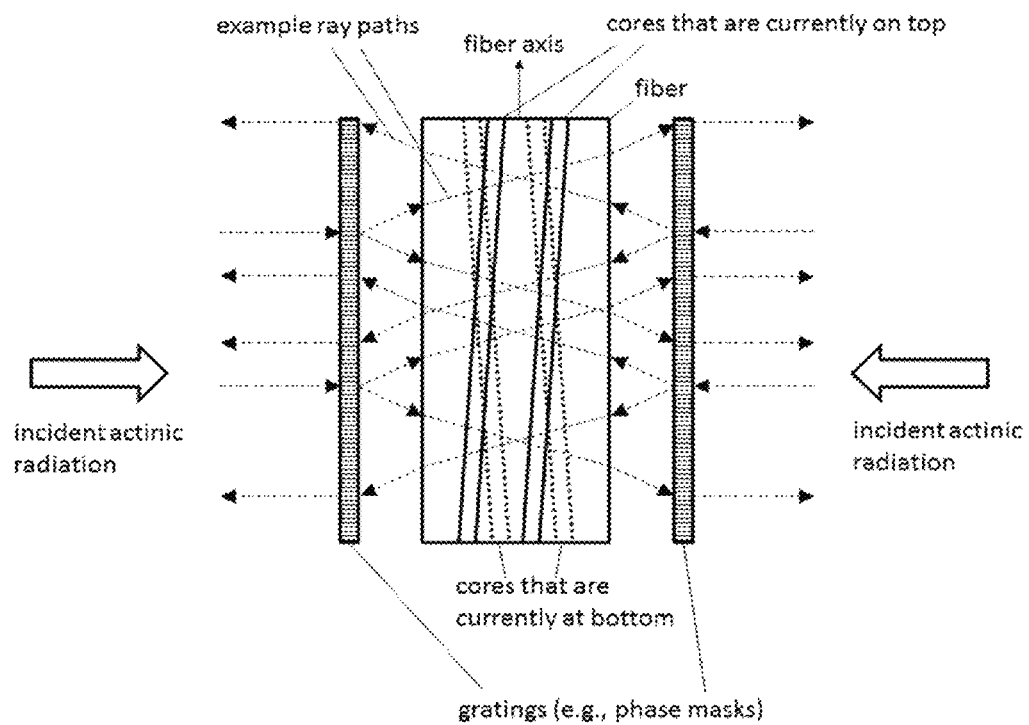
FIG. 5 is a top view schematic of phase mask based exposure of a twisted multicore fiber from two opposite directions (azimuthal angle difference 180°) in accordance with the invention.

To counteract the abovementioned defects in gratings inscription caused by lensing, shadowing, and the like, we expose the fiber to radiation from at least two azimuthal directions, see FIG. 3 (showing the example case of three directions). The rays incident on the fiber are usually a superposition of at least two beams with different wave vector components in the direction of the fiber axis, e.g., generated by a phase mask that is parallel to the fiber, as shown in FIGS. 1, 4, and 5. Thus, refractional and diffractional effects from transverse inhomogeneities within the fiber profile are being averaged over the exposures from different azimuthal angles. These exposures can take place either simultaneously or consecutively. The different incoming beams may either stem from different sources (e.g., lasers) or from one common source with appropriate optics, see also FIG. 6. As a result, the refractive index modulation can be more uniform within each transverse plane (perpendicular to fiber axis).

In the case of multicore fibers, the variance of the grating strength in the different cores within each transverse plane can be reduced by this multidirectional exposure. Graphically, this corresponds to summing up at least two translated copies of the curve in FIG. 2. To achieve the best possible averaging effect, the spikes in the different copies should not coincide. For instance, in the case of a 7-core fiber that has one core in the center and 6 cores on a circle with azimuthal spacing of 60° (see FIG. 2), the incident angles should not differ by ±30°, ±60°, ±90° etc. In contrast, with an angle difference of ±15°, ±75°, ±135° etc., no spikes would coincide. With an angle difference of ±180° (see FIGS. 4 and 5), only some shadows in the center core would coincide, but none in outer cores.

For any (multicore, single core, microstructured, etc., twisted or untwisted) fiber, the multidirectional exposure can also reduce the transverse dependence (within the transverse plane) of the refractive index change within each core. This can reduce the coupling between different modes and it can therefore reduce the cladding mode loss.

In FIGS. 1, 4, and 5, we assume that gratings (e.g., phase masks) are used to split the incoming radiation into several beams with different longitudinal components of the wave vector (not to be confused with the two or more different azimuthal directions in FIG. 3). In the longitudinal direction, i.e., parallel to the fiber axis, the interference pattern of these beams is quasi-periodic, as required to write the Bragg gratings. Alternatively, such a longitudinal interference pattern can also be achieved without a grating (or phase mask) by superposing several beams that already have wave vectors with different longitudinal components. Therefore, the gratings (phase masks) in FIGS. 1, 4, and 5 are optional and not necessary if the incoming actinic radiation already has the required different longitudinal components of their wave vectors. Additionally, as shown in FIG. 4, a stabilizing ray that does not strike the fiber can be provided as a control. The stabilizing ray may be actinic, but this is not necessary.

Figure 6:
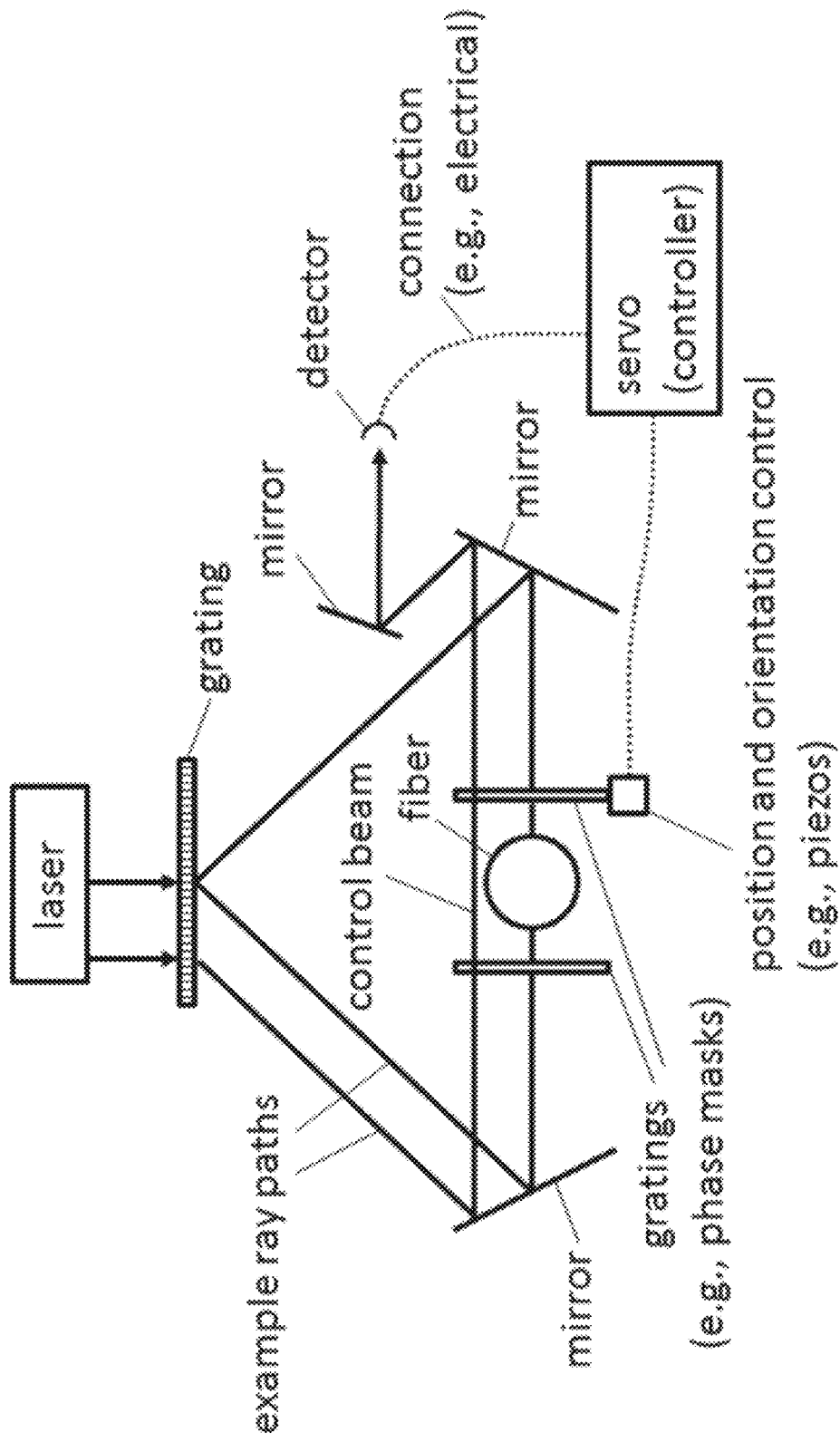
FIG. 6 is a schematic depicting a control loop with exposure from two opposite directions (azimuthal angle difference 180°) in accordance with the invention.
Figure 7:
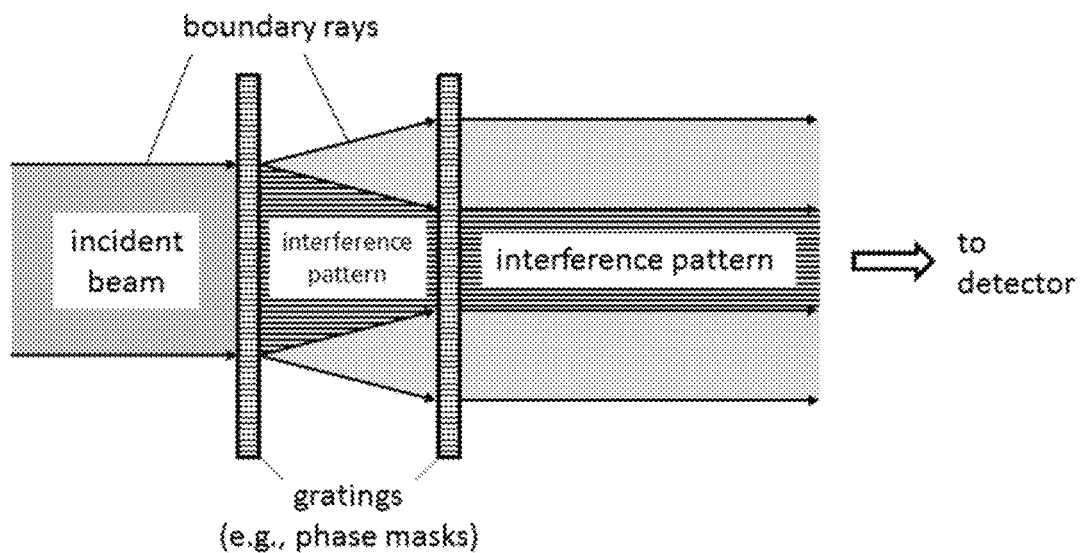
FIG. 7 is a top view schematic of a control beam between phase masks in the setup of FIG. 6.

To avoid destructive interference that would dramatically impair the grating strength across the fiber transverse dimension, it is important that the periods and phases of the longitudinal interference patterns are the same for all the incident actinic beams from the different azimuthal directions as they propagate through the fiber transverse dimension. Since there are offset cores, this matching must be maintained across the fiber diameter. This can be achieved, e.g., by a suitable control loop that controls the positions and orientation of one or several beams or phase masks, e.g., using piezos. An example is shown in FIG. 6. The corresponding interference pattern of the control beam that does not hit the fiber is shown in FIG. 7. The control loop of FIG. 6 acts to stabilize this interference pattern. Note that the piezo motion control attached to the phase mask can act to adjust both the position along the fiber axis as well as the orientation of the phase mask. Although not shown in FIG. 7 it is also possible to use the Fabry Perot cavity formed by blank (non-grooved) areas of the two masks to provide a control signal for the orientation of the two masks. In this case two beams would be required for stabilization: one beam for fringe stabilization and one beam for orientational stabilization. The beams could be part of the actinic beam or be separate beams. With more interference patterns, more stabilization servo loops would be required.

To achieve the interference pattern shown on the right of the right grating in FIG. 7, it is very important that both masks have exactly the same (quasi-) periodic groove structure. This can be achieved, e.g., by cutting (perpendicular to the grooves) a wide mask into two narrower masks that then automatically have exactly the same groove structure, if the grooves of the original mask were parallel. If the length (parallel to the fiber axis) of the interference pattern is relatively short (typically less than a few millimeters), an active stabilization may not be necessary.

Figure 8:
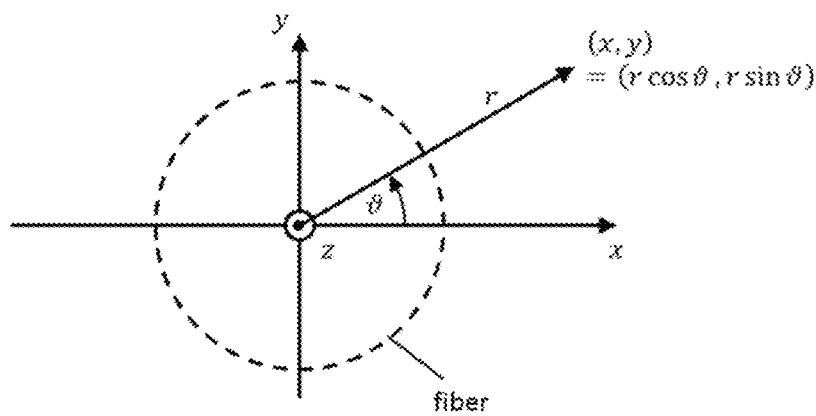
FIG. 8 is a graph depicting the coordinate system with azimuthal angle $\theta$, longitudinal coordinate z, and radial coordinate r. The transverse plane is spanned by the x and y directions.

The azimuthal angle $\theta$ is defined in the coordinate system in FIG. 8. The drawing plane is the transverse plane with coordinates x and y. The z-axis, which is perpendicular to the drawing plane and pointing towards the reader, is usually identical with the fiber axis.

In a Bragg grating, the effective index $\overline{n_{\it eff}}$ of a certain eigenmode (e.g., the fundamental mode) of the surrounding waveguide (e.g., a core within an optical fiber) is perturbed along the waveguide axis with a quasi-periodic modulation that has the average grating period $\Lambda$. Such a grating reflects this eigenmode during its propagation if the wavelength $\lambda$ is sufficiently close to the Bragg wavelength $\lambda_B := 2n_{\it eff}\Lambda$, because the spatial frequency $$\frac{1}{\Lambda}$$

of the Bragg grating then equals the difference between the spatial frequencies $$\frac{\overline{n_{\it eff}}}{\lambda}$$

and $$-\frac{\overline{n_{\it eff}}}{\lambda}$$

of the forward and backward propagating eigenmodes.

A Bragg grating can be fabricated, e.g., by exposing the waveguide to the interference pattern of two actinic beams with wave vectors that have different longitudinal components (i.e., in the direction of the fiber axis). An example is shown in FIG. 7: The left phase mask splits the incident beam into two first-order diffracted beams (we neglect the zeroth and higher diffraction orders, or assume that the mask has a perfect conversion efficiency into the first diffraction order). One of these two beams is propagating to the upper right, the other one is propagating to the lower right. Since the longitudinal direction of the fiber axis is parallel to the drawing plane and parallel to the phase masks, the longitudinal components of their wave vectors have a different sign, giving rise to the interference pattern shown between the masks. The distance between the fringes of the interference pattern is determined by the angle between the two different beams, and thus by the period of the mask (grating).

Instead of using a single incident beam and a grating to split the beam into two directions, an interference pattern can also be generated by superposing two or any multiple of two beams from different sources, so long as the phase of each beam are sufficiently constant with respect to each other (same frequency and sufficient temporal and spatial coherence). In this case, the gratings (e.g., phase or amplitude masks) shown in FIGS. 1, 4, 5 are replaced by other (free space) optics that produce the interfering beams.

If the beam is actinic, the fiber that is exposed to this interference pattern experiences a modulation of its refractive index distribution, depending on the local intensity, exposure time and local photosensitivity inside the fiber, which itself depends on the chemical composition of the fiber. Our invention can be applied to any fiber geometry (e.g., single core fibers, multicore fibers, microstructured or photonic crystal fibers, large mode area fibers, single mode fibers, multimode fibers, higher-order-mode fibers, etc.) with any photosensitivity distribution, and both stripped (coating removed) and unstripped (coated) fiber, as long as the coating is sufficiently transparent to the actinic radiation. In particular, the Bragg grating (refractive index modulation) does not have to be restricted to one or several cores of the fiber. Instead, the grating can also extend partially or exclusively to the cladding or parts thereof, because our invention in general lowers the usually unwanted transverse variations of the index change that is caused by diffraction and refraction effects from inhomogeneities of the fiber itself.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. A method of inscribing a grating in an optical fiber having at least one core and at least one cladding comprising the steps of:
   a) exposing the fiber to at least a first beam of actinic radiation from a first azimuthal direction around the longitudinal axis of the fiber; and
   b) exposing the fiber to at least a second beam of actinic radiation from at least a second azimuthal direction around the longitudinal axis of the fiber.

2. A method of inscribing a grating in an optical waveguide according to claim 1, further comprises the steps of:
   providing a first source to generate the first beam of actinic radiation from the first azimuthal direction; and
   providing a second source to generate the second beam of actinic radiation from the second azimuthal direction.

3. A method of inscribing a grating in an optical waveguide according to claim 1, further comprising the step of providing a common source to generate both the first and second beams of actinic radiation from the first and second azimuthal directions.

4. A method of inscribing a grating in an optical waveguide according to claim 1, further comprising the step of c) splitting the first and second beams of actinic radiation of steps a) and b) into a plurality of beams with different longitudinal components of their wave vectors so as to form interference patterns that inscribe one or more gratings.

5. A method of inscribing a grating in an optical waveguide according to claim 4, wherein said step c) further comprises the steps of providing gratings or phase masks to split the first and second beams of actinic radiation into a plurality of beams with different longitudinal components of their wave vectors so as to form interference patterns that can inscribe gratings.

6. A method of inscribing a grating in an optical waveguide according to claim 5, further comprising the step of d) matching the periods and phases of the interference patterns of the first and second beams of actinic radiation.

7. A method of inscribing a grating in an optical waveguide according to claim 6, step d) further comprising the steps of:
   providing a control beam that does not hit the waveguide; and
   providing a control loop that controls at least one of the position or orientation of at least one of the first and second interference patterns of actinic radiation.

8. A method of inscribing a grating in an optical waveguide according to claim 7, wherein the control loop controls at least one of the position or orientation of the phase mask in the beam path to control the position or orientation of at least one of the first and second interference patterns.

9. A method of inscribing a grating in an optical waveguide according to claim 1, wherein the inscription being performed on the waveguide comprises Bragg gratings.

10. A method of inscribing a grating in an optical waveguide according to claim 1, wherein the second beam irradiates regions of the waveguide that are affected by shadowing and lensing of the first beam.

11. An apparatus for inscribing a grating in an optical fiber having at least one core and at least one cladding comprising the steps of:
   at least a first beam of actinic radiation at a first azimuthal direction around the longitudinal axis of the fiber; and
   at least a second beam of actinic radiation from at least a second azimuthal direction around the longitudinal axis of the fiber.

12. An apparatus for inscribing a grating in an optical waveguide according to claim 11, further comprising:
   a first source generating said first beam of actinic radiation from said first azimuthal direction; and
   a second source generating said second beam of actinic radiation from said second azimuthal direction.

13. An apparatus for inscribing a grating in an optical waveguide according to claim 11, further comprising a common source generating both the first and second beams of actinic radiation from the first and second azimuthal directions.

14. An apparatus for inscribing a grating in an optical waveguide according to claim 11, further comprising first and second gratings or phase masks adapted to split said first and second beams of actinic radiation each into a plurality of beams with different longitudinal components of their wave vectors so as to form interference patterns that can inscribe gratings.

15. An apparatus for inscribing a grating in an optical waveguide according to claim 14, wherein the periods and phases of the interference patterns of said first and second beams of actinic radiation are matched.

16. An apparatus for inscribing a grating in an optical waveguide according to claim 15, further comprising:
   a control beam that does not hit the waveguide; and
   a control loop that controls at least one of the position or orientation of at least one of said first and second interference patterns of actinic radiation.

17. An apparatus for inscribing a grating in an optical waveguide according to claim 11, wherein the inscription being performed on the waveguide comprises Bragg gratings.

18. An apparatus for inscribing a grating in an optical waveguide according to claim 11, wherein said second beam irradiates regions of the waveguide that are affected by shadowing and lensing of said first beam.

19. An optical fiber, comprising at least one core and at least one cladding and a grating inscribed on said core via exposure to at least a first beam of actinic radiation from a first azimuthal direction around the longitudinal axis of the fiber and at least a second beam of actinic radiation from at least a second azimuthal direction around the longitudinal axis of the fiber, wherein the second beam irradiates a region of said fiber that are affected by shadowing and lensing of the first beam.

20. An optical waveguide according to claim 19, wherein said grating comprises a Bragg grating.

* * * * *